United States Patent [19]

Murphy et al.

[11] Patent Number: 5,244,617

[45] Date of Patent: Sep. 14, 1993

[54] CONSOLIDATION AND MOLDING OF POLYBENZAZOLE-CONTAINING MATERIALS

[75] Inventors: Connie J. Murphy; Wen-Fang Hwang, both of Midland, Mich.

[73] Assignee: The Dow Chemical Company, Midland, Mich.

[21] Appl. No.: 831,713

[22] Filed: Feb. 5, 1992

[51] Int. Cl.$^5$ .............................................. B29C 43/14
[52] U.S. Cl. .................................. 264/120; 264/126; 264/319; 264/331.11; 528/342
[58] Field of Search ............... 264/120, 126, 248, 319, 264/331.11, 331.12; 528/342

[56] References Cited

U.S. PATENT DOCUMENTS

| | | | |
|---|---|---|---|
| 3,886,251 | 5/1975 | Sekiguchi et al. | 264/184 |
| 3,950,467 | 4/1976 | Yazawa et al. | 264/237 X |
| 4,207,407 | 6/1980 | Helminiak et al. | 525/425 |
| 4,229,566 | 10/1980 | Evers et al. | 528/185 |
| 4,359,567 | 11/1982 | Evers | 528/179 |
| 4,377,546 | 3/1983 | Helminiak et al. | 264/232 |
| 4,533,692 | 8/1985 | Wolfe et al. | 524/417 |
| 4,533,693 | 8/1985 | Wolfe et al. | 524/417 |
| 4,533,724 | 8/1985 | Wolfe et al. | 528/313 |
| 4,578,432 | 3/1986 | Tsai et al. | 525/432 |
| 4,606,875 | 8/1986 | Chenevey et al. | 264/184 |
| 4,631,318 | 12/1986 | Hwang et al. | 525/432 |
| 4,703,103 | 10/1987 | Wolfe et al. | 528/179 |
| 4,717,619 | 1/1988 | Letinski | 428/287 |
| 4,749,753 | 6/1988 | Nishihara et al. | 525/411 |
| 4,810,735 | 3/1989 | Uy | 524/157 |
| 4,814,530 | 3/1989 | Ward et al. | 528/342 |
| 4,845,183 | 7/1989 | Mueller et al. | 528/185 |
| 4,853,178 | 8/1989 | Oslin | 419/23 |
| 4,939,215 | 7/1990 | Mueller et al. | 525/434 |
| 4,939,235 | 7/1990 | Harvey et al. | 528/337 |
| 5,021,517 | 6/1991 | Wange et al. | 525/417 |
| 5,030,706 | 7/1991 | Harris et al. | 528/183 |
| 5,139,863 | 8/1992 | Alvarez et al. | 428/297 |
| 5,167,889 | 12/1992 | Alvarez et al. | 264/120 |

FOREIGN PATENT DOCUMENTS

| | | |
|---|---|---|
| 0298753 | 1/1989 | European Pat. Off. |
| 0388803 | 9/1990 | European Pat. Off. |
| 71028647 | 1/1974 | Japan |
| 74-029899 | 8/1974 | Japan |
| 55-133918 | 10/1980 | Japan |
| 58-093722 | 6/1983 | Japan |
| 62-181110 | 8/1987 | Japan |
| 8602368 | 4/1986 | World Int. Prop. O. |

OTHER PUBLICATIONS

11 Ency. Poly. Sci. & Eng. pp. 601, 619 and 620 (J. Wiley & Sons 1988).
11 Ency. Poly. Sci., pp. 507–569; 631–632.
Journal of Polymer Material Science Engineering, vol. 57, pp. 512–521 (1987).
Polymer Journal, vol. 21, No. 10, pp. 771–780 (1989).
Polymer Engineering and Science, 1983, vol. 23, No. 14, pp. 784–787.
B22(2) J. Macromol. Sci.–Phys. 231, 234–235 (1983).
14 Macromoleulues 925 (1981).
24 J. Poly. Sci. Part A 1863 (1986).

Primary Examiner—Mary Lynn Theisen

[57] ABSTRACT

A process for consolidating/molding a material made of (a) block copolymers of rigid or semi-rigid PBZ with thermoplastic polymers, (b) block copolymers of rigid PBZ with semi-rigid PBZ, (c) molecular composites of rigid or semi-rigid PBZ with thermoplastic polymers, (d) molecular composites of rigid or semi-rigid PBZ with non-rigid PBZ polymers or (e) semi-rigid PBZ polymers, whereby the material, in its substantially acid-free, wet coagulated state, and in the form of a plurality of films or film layers, filaments or fibers, powders or granules, film layers, filaments or particulate, is subjected to a first pressure P1 which is sufficient to provide a substantially void-free consolidated material upon molding. Heat and a second pressure P2 is then applied to the wet coagulated material in amounts sufficient to fuse the films or film layers, filaments or fibers, powders, or granules into a single entity. Prior tot he application of the first pressure P1, surface water remaining on the material is removed, leaving the material with sufficient water to plasticize it.

5 Claims, No Drawings

CONSOLIDATION AND MOLDING OF POLYBENZAZOLE-CONTAINING MATERIALS

STATEMENT OF GOVERNMENT INTEREST

This invention was made with government support under Contract F33615-86-C-5068 awarded by the Department of the Air Force. The government has certain rights in this invention.

BACKGROUND OF THE INVENTION

The present invention relates to the art of consolidation/molding of polybenzazole (PBZ) polymers and molecular composite materials containing these polymers.

PBZ polymers, i.e., polybenzoxazole, polybenzothiazole and polybenzimidazole, and their synthesis are described in great detail in the following patents which are incorporated by reference: Wolfe et al., *Liquid Crystalline Polymer Compositions, Process and Products*, U.S. Pat. No. 4,703,103 (Oct. 27, 1987): Wolfe et al., *Liquid Crystalline Polymer Compositions, Process and Products*, U.S. Pat. No. 4,533,692 (Aug. 6, 1985); Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985): Evers, *Thermoxidatively Stable Articulated p-Benzobisoxazole and p-Benzobisthiazole Polymers*, U.S. Pat. No. 4,359,567 (Nov. 16, 1982): Tsai et al., *Method for Making Heterocyclic Block Copolymer*, U.S. Pat. No. 4,578,432 (Mar. 25, 1986) and 11 Ency. Poly. Sci. & Eng., *Polybenzothiazoles and Polybenzoxazoles*, 601 (J. Wiley & Sons 1988).

Shaped articles made from consolidated polybenzazole polymers and molecular composite materials containing the same are known to be useful in aircraft, electronic and other commercial applications where heat, chemical and radiation resistance are desired in conjunction with good mechanical and electrical properties.

Typically, materials which have a melting or softening point are suitable for consolidation. Those materials which show no transitions (melting or softening) below their decomposition temperatures, such as rigid and semi-rigid polybenzazoles, have been considered unsuitable for consolidation.

Many mixtures and variations of PBZ have been made attempting to improve its processing such as the following:

(a) block copolymers of PBZ with thermoplastic polymers, such as those described in U.S. Pat. No. 5,030,706, EPO Publication No. 0 388 803 (Sep. 26, 1990), copending U.S. application Ser. No. 547,650, filed Jul. 2, 1990 and U.S. application Ser. No. 562,781, filed Aug. 6, 1990:

(b) block copolymers of rigid PBZ with semi-rigid PBZ, such as those described in U.S. Pat. No. 4,578,432 (Tsai):

(c) molecular composites of PBZ with thermoplastic copolymers and non-rigid PBZ polymers, described in 11 Ency. Poly. Sci. at pages 631-632 "The Materials Science & Engineering of Rigid Rod Polymers" at pages 507-569: and (d) semi-rigid PBZ polymers, described in 11 Ency. Poly. Sci. & Eng. at pages 601, 619 and 620.

Some of these mixtures and variations of PBZ are thermoplastic and some are not. But all are difficult to consolidate into a shaped article without creating substantial voids in the article.

Consolidation processes for molecular composite materials are disclosed in the literature. For example, Wang, et al. in the *Journal of Polymer Material Science Engineering*, Vol. 57, page 512-516, (1987), and in U.S. Pat. No. 5,021,517, discloses consolidating thin films or fibers of molecular composites of poly(p-phenylene polymers into larger specimens: and Ptak et al. in the *Journal of Polymer Material Science Engineering*, Vol. 57, page 517-521 (1987), disclose consolidating coagulated wet molecular composites into bulk form. However, the consolidation process disclosed by Wang, et al. could be used only for materials which contain a component having a melting point or glass temperature to produce a void-free material. In the process of Ptak et al., it takes a long time to consolidate the materials and the acid solvent used in the process is difficult to remove from the materials because of their low surface areas.

It would be highly desirable to provide a simple process which is suitable for making shaped PBZ article which are substantially void-free.

SUMMARY OF THE INVENTION

The present invention is a process for consolidating/molding a material made of (a) block copolymers of rigid or semi-rigid PBZ with thermoplastic polymers, (b) block copolymers of rigid PBZ with semi-rigid PBZ, (c) molecular composites of rigid or semi-rigid PBZ with thermoplastic copolymers, (d) molecular composites of rigid or semi-rigid PBZ with non-rigid PBZ polymers or (d) semi-rigid PBZ polymers, which process comprises:

(1) providing the material in its substantially acid-free, wet coagulated state, and in the form of a plurality of films or film layers, filaments or fibers, powders, or granules.

(2) removing substantially all surface water remaining on the material, leaving the material with sufficient water to plasticize the material, (3) subjecting the material to a first pressure $P_1$ which is sufficient to provide a substantially void-free consolidated material upon molding, and (4) applying heat and a second pressure $P_2$ to the wet coagulated material in amounts sufficient to fuse the films or film layers, filaments or fibers, powders, or granules into a single entity.

Surprisingly, by applying the first pressure $P_1$ to said material prior to the application of heat and second pressure $P_2$, a substantially void-free, fully consolidated material is produced from any of the above-mentioned materials without the extra steps of drying the consolidated material under vacuum for many hours and subsequently annealing it under pressure at the melting point of the thermoplastic material as required by the Wang et al. process.

Another aspect of the present invention is a molded article of the consolidated material produced by the present process. The molded article may be used as a structural material or as an electronic substrate or for any other use in which a thermoset or thermoplastic polymer or a fiber-reinforced thermoset or thermoplastic polymer with similar physical properties would have been suitable.

DETAILED DESCRIPTION OF THE INVENTION

Definitions

The following terms are used in this application and have the meanings and preferred embodiments set out hereinafter unless otherwise specified.

Consolidation—The process of forming a plurality of films or film layers, filaments or particulates into a single entity.

Fully consolidated—The state wherein the films or layers of films, filaments or particulates which are formed into a single entity cannot be separated.

Substantially void-free—Describes a consolidated or molded article having less than 1 percent by volume void space.

Molecular composite—A polymeric material consisting of a rigid rod polymer, such as rigid PBZ, molecularly dispersed in a random coil polymer matrix, such as a thermoplastic polymer. Molecular composites are described in 11 *Ency. Poly. Sci.* at pages 631–632 "The Materials Science & Engineering of Rigid Rod Polymers" at pages 507–569; 1983, Vol. 23, No. 14, pages 784–787, *Polymer Journal*, Vol. 21, No. 10, pages 771–780 (1989), *Polymer Engineering and Science*, 1983, Vol. 23, No. 14, pages 784–787 and U.S. Pat. Nos. 4,207,407, 4,377,546, 4,631,318; 4,749,753 and 4,810,735.

AA/BB-Polybenzazole (AA/BB-PBZ)—A polybenzazole polymer characterized by mer units having a first aromatic group (Ar$^1$), a first and a second azole ring fused with said first aromatic group, and a divalent organic moiety (DM) bonded by a single bond to the 2-carbon of the second azole ring. The divalent organic moiety (DM) is chosen such that it does not interfere with the synthesis, fabrication or use of the PBZ polymer: it is preferably a second aromatic group (Ar$^2$). It may, in some cases, be an alkyl group or a bond. Mer units are preferably linked by a bond from the divalent organic group (DM) to the 2-carbon of the first azole ring in an adjacent mer unit. Mer units suitable for AA/BB-PBZ polymers are preferably represented by Formula 1:

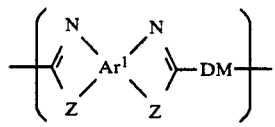

wherein Z is as defined for azole rings subsequently and all other characters have the meaning and preferred embodiments previously given.

AB-Polybenzazole (AB-PBZ)—A polybenzazole polymer characterized by mer units having a first aromatic group (Ar) and a single azole ring fused with said first aromatic group. The units are linked by a bond from the 2-carbon of the azole ring in one mer unit to the aromatic group of an adjacent mer unit. Mer units suitable for AB-PBZ polymers are preferably represented by Formula 2:

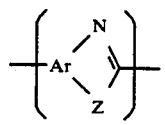

wherein Z is as defined for azole rings subsequently and all other characters have the meaning and preferred embodiments previously given.

Aromatic group (Ar)—Any aromatic ring or ring system. Size is not critical as long as the aromatic group is not so big that it prevents further reactions of the moiety in which it is incorporated.

Phase Separation—The existence within a coagulated article of optically distinct anisotropic domains of polymers. Phase separation may be judged by known characteristics, such as opacity, electron-microscopy, small-angle X-ray scattering or small-angle light scattering. Methods for measuring phase-separation in a system are discussed in Hwang et al., "Composites on a Molecular Level: Phase Relationships, Processing, and Properties," B22(2) *J. Macromol. Sci.-Phys.* 231, 234–35 (1983), which is incorporated by reference.

Polybenzazole (PBZ) polymer—A polymer from the group of polybenzoxazoles and polybenzobisoxazoles (PBO), polybenzothiazoles and polybenzobisthiazoles (PBT) and polybenzimidazoles or polybenzobisimidazoles (PBI). For the purposes of this application, the term "polybenzoxazole (PBO)" refers broadly to polymers in which each unit contains an oxazole ring bonded to an aromatic group, which need not necessarily be a benzene ring. The term "polybenzoxazole (PBO)" also refers broadly to poly(phenylene-benzobis-oxazole)s and other polymers wherein each unit comprises a plurality of oxazole rings fused to an aromatic group. The same understandings shall apply to the terms polybenzothiazole (PBT) and polybenzimidazole (PBI). Polybenzazole polymers used in the present invention are preferably polybenzoxazole or polybenzothiazole, and more preferably polybenzoxazole.

Rigid Rod PBZ polymer—An "intrinsic" or "articulated" rigid rod PBZ polymer as the terms "intrinsic" and "articulated" are defined in the Hwang, "Processing, Structure and Properties of Liquid Crystalline PBT Polymer," Kansai Committee of the Society of Fiber Science and Technology, Japan, Post Symposium on Formation, Structure and Properties of High Modulus and High Tenacity Fibers 23–26 (Aug. 26, 1985): Evers et al, "Articulated All-Para Polymers with 2,6-Benzobisoxazole, 2,6-Benzobisthiazole, and 2,6-Benzobisimidazole Units in the Backbone," 14 *Macromolecules* 925 (1981): Evers, "Thermoxidatively Stable Articulated Benzobisoxazole and Benzobisthiazole Polymers," 24 *J. Poly. Sci.* Part A 1863 (1986) and Evers et al., *Articulated Para-Ordered Aromatic Heterocyclic Polymers Containing Diphenoxybenzene Structures*, U.S. Pat. No. 4,229,566 (Oct. 21, 1980).

Intrinsic rigid rod polymers are essentially rectilinear and are theorized to have a persistence length comparable to their contour length. They contain essentially no angles of catenation less than 150°. Articulated rigid rod polymers comprise a plurality of essentially rectilinear moieties joined by a relatively small number of moieties which are not rectilinear and have angles of catenation less than 150°. Rigid rod PBZ polymers used in the present invention are preferably intrinsic rigid rod polymers.

Solvent acid—Any non-oxidizing liquid acid capable of dissolving PBZ polymers, such as sulfuric acid, methanesulfonic acid, trifluoromethylsulfonic acid, polyphosphoric acid and mixtures thereof, which is suitable for carrying out azole-ring formation or acylation or sulfonation reactions that form block copolymers used in the present invention. It must be sufficiently non-oxidizing that it does not substantially oxidize AB- and BB-PBZ monomers which are dissolved therein. Solvent acids are preferably dehydrating acids, such as polyphosphoric acid or a mixture of methanesulfonic acid and phosphorus pentoxide and/or polyphosphoric acid. The optimum $P_2O_5$ content of polyphosphoric acid depends upon the stage of processing. Polyphosphoric acid that is used to make polybenzazole polymers preferably contains initially at least about 80 weight percent $P_2O_5$ and more preferably at least about 85 weight percent $P_2O_5$.

Description of the Invention

Suitable thermoplastic block copolymers containing blocks of rigid rod or semi-rigid polybenzazole polymer and blocks of thermoplastic polymer and processes for making them include, but are not limited to, those described in Harris et al., Copolymers Containing Polybenzoxazole, Polybenzothiazole and Polybenzimidazole Moieties, International Application No. PCT/US89/04464 (filed Oct. 6, 1989), International Publication No. WO 90/03995 (published Apr. 19, 1990) and in Harris et al., Thermoplastic Compositions Containing Polybenzoxazole, Polybenzothiazole and Polybenzimidazole Moieties and Process for Making Shaped Articles from Them, EPO Application 90104963.5 (filed Mar. 16, 1990), EPO Publication 0 388 803 (published Sep. 26, 1990).

Suitable molecular composites of rigid or semi-rigid PBZ with thermoplastic copolymers, non-rigid PBZ polymers or semi-rigid PBZ Polymers include, but are not limited to, those described in 11 *Encyl. Poly. Sci.* at pages 631–632 "The Materials Science & Engineering of Rigid Rod Polymers" at pages 507–569, EPO Publication 0 298 753 and U.S. Pat. Nos. 4,631,318, 4,207,407, 4,749,753 and 4,377,546.

Rigid and Semi-rigid Polybenzazole Blocks

Rigid and semi-rigid polybenzazole blocks are well-known and are described in U.S. Pat. No. 4,578,432 (Tsai). The rigid or semi-rigid polybenzazole block is most preferably a rigid rod block. Rigid and semi-rigid polybenzazole homopolymers typically are not thermoplastic and typically form liquid crystalline solutions when dissolved at relatively high concentration in a solvent. Mer units that are suitable to make rigid and semi-rigid polybenzazole mer units are well know in the art.

The rigid or semi-rigid polybenzazole block may contain AB-PBZ mer units or AA/BB-PBZ mer units or both, as those units are previously defined and depicted. It preferably contains AA/BB-PBZ mer units and more preferably consists essentially of AA/BB-PBZ mer units.

Examples of the most preferred mer units for the rigid or semi-rigid polybenzazole block are set out in the Formulae:

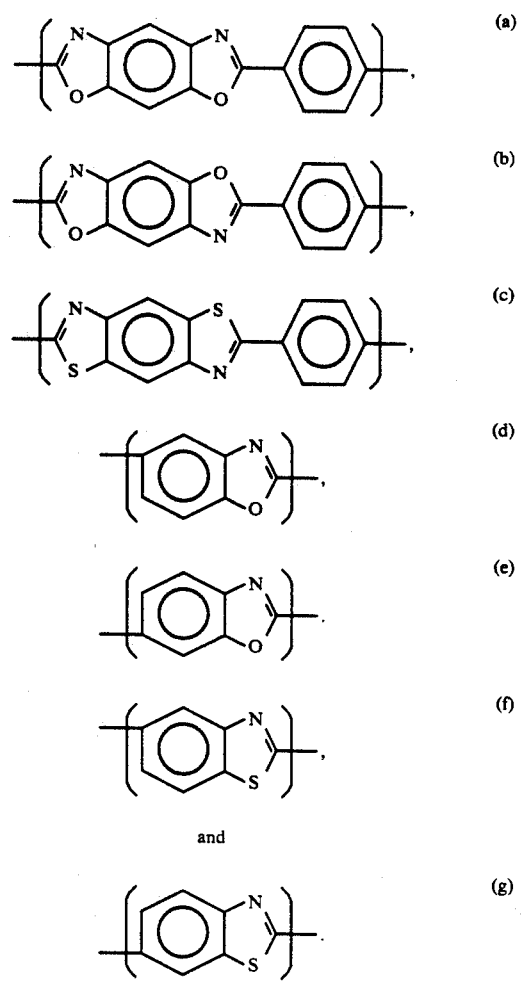

Thermoplastic Blocks

The thermoplastic block contains a polymer that is stable in a solvent acid. The polymer must be able to be linked to the polybenzazole block either by polymerizing in a solvent acid solution containing the polybenzazole blocks or by polymerization in a separate medium and subsequent linking of the blocks by reaction of end groups in a solvent acid. The thermoplastic block may contain a thermoplastic polybenzazole polymer, or a thermoplastic acid soluble polymer that is not a polybenzazole, or a random or sequential copolymer that contains both mer units of a polybenzazole polymer and mer units of a thermoplastic acid soluble polymer that is not a polybenzazole.

(A) Thermoplastic Polybenzazoles

Thermoplastic polybenzazole polymers are known and are described in Harris et al., Thermoplastic Compositions Containing Polybenzoxazole, Polybenzothiazole and Polybenzimidazole Moieties and Process for Making Shaped Articles from Them, EPO Application 90104963.5 (filed Mar. 16, 1990), EPO Publication 0 388 803 (published Sep. 26, 1990) and in K.-U. Bühler, *Spezialplaste* 838–866 (Akademie-Verlag 1978). They are neither rigid nor semi-rigid polymers, and they typically do not form liquid crystalline solutions.

(B) Thermoplastic Non-Polybenzazole Polymers and Copolymers

Other suitable thermoplastic polymers include polyamide, thermoplastic polyimide, polyquinoxaline, polyquinoline, poly(aromatic ether ketone) and/or a poly(aromatic ether sulfone), or a copolymer of those polymers with each other and/or polybenzazole. The more preferred polymers are polyamide, poly(aromatic ether ketone) or poly(aromatic ether sulfone) or a copolymer with each other and/or polybenzazole. Suitable thermoplastic blocks are described in International Publication No. WO 90/03995 (published Apr. 9, 1990) at pp. 73–102.

Exemplary copolymers of polyamide or poly(aromatic ether) are described in Dahl et al., *Aromatic Polyether Ketones Having Imide, Amide, Ester, Azo, Quinoxaline, Benzimidazole, Benzoxazole or Benzothiazole Groups and a Method of Preparation*, International (PCT) application WO86/02368 (published Apr. 24, 1986), and in Harris et al., *Copolymers Containing Polybenzoxazole, Polybenzothiazole and Polybenzimidazole Moieties*, International Application No. PCT/US89/04464 (filed Oct. 6, 1989), International Publication No. WO 90/03995 (published Apr. 19, 1990).

The mixtures and variations of PBZ (block copolymers and molecular composites) are ordinarily formed in a solvent acid solution or dope, from which they may be coagulated by contacting the dope with a non-solvent diluent such as water, to form high surface area materials, such as films, filaments or fibers, powders, or granules. If a non-phase separated material is desired, the dope should be in an optically isotropic (non-liquied crystalline) state when coagulated in order to form a coagulated product which is at least planar isotropic (isotropic in two dimensions) and is more preferably isotropic in three dimensions. The coagulated product is most preferably not substantially phase separated. Liquid crystalline dopes tend to form phase separated and anisotropic coagulated products.

Optical isotropy and anisotropy of the dope can be determined by a number of tests familiar to persons of ordinary skill in the art, such as those described in Hwang et al., "Composites on a Molecular Level: Phase Relationships, Processing, and Properties," B22(2) J. Macromol. Sci.-Phys. 231, 234–35 (1983), which is incorporated by reference. A simple method is to see if the solution exhibits birefringence when viewed under a microscope under cross-polar conditions. Within even optically isotropic solutions, some association of rigid rod blocks is inevitable on a molecular scale. However, in polymers precipitated from the optically isotropic phase, the level of anisotropy and phase-separation is preferably small enough to provide a block copolymer or polymer composition which is essentially a molecular composite.

The dope may also contain other additives that precipitate with the polymers, such as stabilizers or coloring agents. Preferably, such additives are minimized.

The non-solvent is preferably aqueous. The non-solvent may be basic or slightly acidic, but is preferably neutral at the commencement of its use. Of course, the non-solvent bath may become progressively more acidic as it coagulates more dope unless the non-solvent in the bath has a reasonably steady flow of non-solvent to and from the bath or a pH adjusting material is added.

Contacting the dope with a non-solvent may be done by extruding the dope through a suitable spinneret or die into a coagulation bath of a non-solvent, such as deionized water, forming wet coagulated filaments or fibers, or films. Alternatively, the dope can be sprayed in a fine mist into the coagulation bath to form wet, coagulated powders or granules, as described in copending application Ser. No. 547,650, filed Jul. 2, 1990. Methods to form high surface area materials from polymers, block copolymers or molecular composites are well known in the art.

The consolidation/molding process comprises (1) washing the wet coagulated films, filaments or fibers, powders, or granules (wet coagulated material) with water or other non-solvent to remove any residual solvent acid, (2) removing any surface water from the wet coagulated material, (3) placing the wet coagulated material on a support or in a mold and applying a first pressure $P_1$ to the wet coagulated material which is sufficient to provide a substantially void-free consolidated material upon molding, and (4) applying heat and a second pressure $P_2$ to the wet coagulated material in amounts sufficient to fuse the films, filaments or fibers, powders or granules into a single entity. Surprisingly, by applying the first pressure $P_1$, the heat and the second pressure $P_2$ in this sequence, a void-free material is produced without the extra steps of drying the consolidated material under vacuum for many hours and subsequently annealing it under pressure at the melting point of the thermoplastic material.

If a shaped article is desired, the wet coagulated material is placed in a mold. The mold may be as simple as two heated platens for making a flat plaque or may be complex, such as that employed, for example, in molding intricately designed articles containing undercuts, side draws and small holes. The wet coagulated material may be molded neat in the mold, or fibers may be intermixed with it such that the resulting molded product is a fiber-reinforced composite. Examples of suitable fibers include aramid fibers, carbon fibers, glass fibers, ceramic fibers, quartz fibers and polybenzazole fibers. The composite material may also be molded in a mixture with additives, such as stabilizers, fillers, coloring agents, rubber modifiers or other additives.

The temperature and pressure of consolidation/molding are chosen so that the individual films, filaments, powders or granules fuse to form a single article. Optimum temperature, pressure and time of molding necessarily depend upon the composition of the polymers in the thermoplastic block copolymers or molecular composites. Copolymers that contain longer rigid or semi-rigid segments, contain higher concentrations of rigid and semi-rigid segments and have higher average molecular weights ordinarily require higher molding temperatures and pressures and longer molding times than similar copolymers that contain shorter rigid or semi-rigid segments, contain lower concentrations of rigid and semi-rigid segments and/or have lower average molecular weights.

The temperature should also be below the temperature at which substantial decomposition occurs in the thermoplastic block copolymer or molecular composite material. The preferred temperatures are highly dependent upon the chemical and physical make-up of the material. Optimum temperatures for each material may be determined without undue experimentation by persons of ordinary skill in the art. The most preferred temperature is set forth in the following working examples.

The first pressure $P_1$ is a fluid pressure which can be applied by means of air, steam, water or vacuum, to a flexible material, such as a bag assembly, which transmits the pressure to the material being consolidated/molded. Preferably, the first pressure $P_1$ is about 1 psi (0.007 MPa) up to about 100 psi (0.7 MPa). Most preferably, the first pressure $P_1$ is about 1 atmosphere (14.7 psi, 0.1 MPa).

The second pressure $P_2$ may be any pressure at which the films, filaments, powders or granules will fuse and consolidate to form a single article. Preferred pressure is dependent upon the physical and chemical make-up of the granular composition and upon the temperature at which molding occurs. The pressure is preferably no more than about 50,000 psi (350 MPa), more preferably no more than about 10,000 psi (70 MPa) and most preferably no more than about 5000 psi (35 MPa). Optimum pressure may be determined by persons of ordinary skill in the art without undue experimentation. The most preferred conditions employed in the present consolidation/molding process are set forth in the following working examples.

The molded article may optionally be annealed after it is molded. Annealing may take place at subatmospheric or supratmospheric pressures, but is conveniently at ambient pressure. The atmosphere for annealing is preferably air or nitrogen, but may be any other atmosphere in which the polymer is essentially stable under annealing conditions. Annealing typically causes an increase in the tensile strength of the molded article, but may also cause a slight decrease in the tensile modulus of the molded article.

The product of the molding process is a molded article containing the block copolymers or molecular composites previously described, wherein the film, filaments or fibers, powders, or granules thereof are fused together. The fusion of individual pieces may be less than perfect and complete, but the molded article is preferably substantially void-free (less than 1 percent void space). The polymer in the molded article is preferably at least optically planar isotropic and more preferably optically isotropic in all dimensions. The molded article may exhibit some crystalline zones.

The molded article preferably has physical properties which are superior to the physical properties of similar molded articles that contain only polymers similar to the thermoplastic block of the block copolymer. For instance, the molded article may have higher tensile strength, tensile modulus, flexural modulus, flexural strength, dimensional stability and/or solvent resistance.

The molded article is preferably not optically phase separated. It preferably has a thickness of 10 mil, and more preferably at least about ⅛ inch. The maximum thickness is limited primarily by practical considerations, such as scale of equipment and the ability to heat the sample to a proper temperature throughout. It may be used as a structural material or as an electronic substrate or for any other use in which a thermoplastic polymer corresponding to the thermoplastic portion of the block copolymer or molecular composite would have been suitable.

The following working examples are given to illustrate the invention and should not be construed as limiting its scope. Unless otherwise indicated, all parts and percentages are by weight.

EXAMPLE 1

A. Preparation of a Film of a Block/Segmented Copolymer of CisPBO and PEKBO at a Weight Ratio of 70 to 30

A dope is formed containing 70 weight percent cis-polybenzoxazole (CisPBO) and 30 weight percent thermoplastic polybenzoxazole/poly(aromatic ether ketone) copolymer (PEKBO). The solvent acid of the dope is a mixture of methanesulfonic acid, polyphosphoric acid and phosphorus pentoxide.

The cis-polybenzoxazole blocks in the block copolymer have the calculated average number of mer units of 19. The polybenzoxazole/(aromatic ether ketone) blocks in the block copolymer are the product of reacting 4,6-diaminoresorcinol, Oxy-bis-(4-benzoyl chloride) and 1,4-bis-(phenoxy)benzene in a molar ratio of about 1:2:1.

The block copolymer is synthesized by (1) reacting the polybenzoxazole oligomer and 4,6-diaminoresorcinol with 2 moles of oxy-bis-(4-benzoyl chloride) per mole of oligomer and 4,6-diaminoresorcinol combined: (2) reacting the product of step 1 with about 1 mole of 1,4-bis(phenoxy)benzene per mole of oligomer and 4,6-diaminoresorcinol combined under conditions such that aromatic electrophilic substitution occurs. The process is described in detail in Harris et al., Copolymers containing Polybenzoxazole, Polybenzothiazole and Polybenzimidazole Moieties, International Application No. PCT/US 89/04464 (filed Oct. 6, 1989), International Publication No. WO 90/03995 (published Apr. 19, 1990) and in U.S. patent application Ser. No. 407,973 (filed Sep. 15, 1989).

The resulting block copolymer composition has the calculated average structure illustrated in Formula 4: wherein:

a is a number of mer units in the rigid rod polybenzazole blocks, which is about 19:

b is a number of mer units in the thermoplastic block, chosen such that on

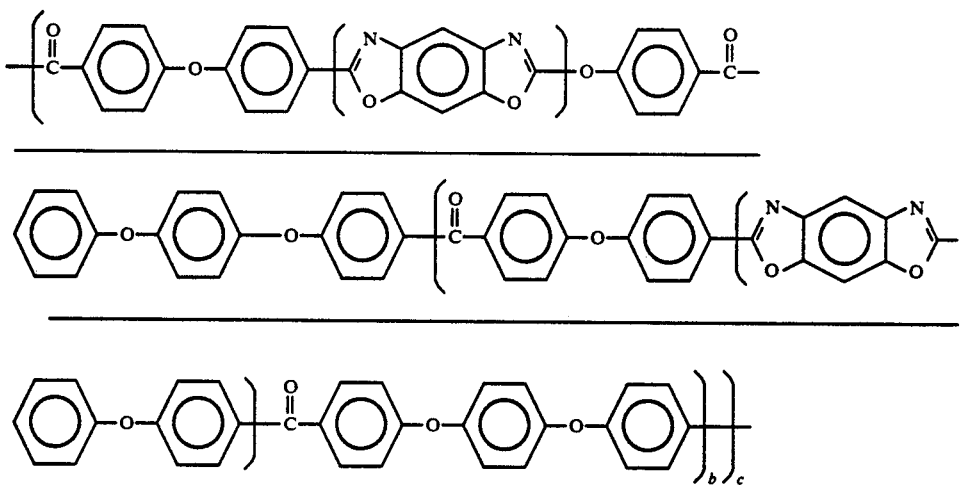

average the weight ratio of rigid rod polymer to thermoplastic polymer corresponds to the weight ratio of 70 to 30:

c is a number of repeating units such that the block copolymer has on average a molecular weight corresponding to the inherent viscosity of 11.5 dL/g: and d is the number of repeating units within each mer unit of the thermoplastic block which averages about 1.

The block copolymer composition contains the percentages of each polymer and has the inherent viscosity 11.5 dL/g, as measured in methanesulfonic acid at 25° C. and 0.05 g/dL concentration. Its concentration in the dope is 3 weight percent. The resulting dopes are optically isotropic (not liquid crystalline). Film is prepared by casting the dope onto a polished steel roll.

B. Consolidation of the Film

The film prepared in Part A is washed with water for 48 hours to remove the solvent acid. Without allowing the film to dry, the surface water is removed with paper towels. The film is folded back and forth upon itself to form a stack 6 layers thick. A 2.54 cm×10.16 cm (×6 layer) sample is cut and placed into a vacuum bag assembly. Vacuum (atmospheric pressure) is applied and the assembly is placed in a hydraulic press. The sample is then consolidated/molded according to the following schedule:
1. Ramp room temperature to 100° C. at contact pressure. Hold for 10 minutes.
2. Ramp contact pressure to 34.5 MPa at 100° C.
3. Ramp 100° C. to 400° C. at 34.5 MPa. Hold for 10 minutes.
4. Cool under vacuum and pressure to >100° C.

The piece is removed from the vacuum bag assembly. The piece produced appears to be fully consolidated (i.e., individual film layers could not be seen or separated) and is deep purple and glossy. The piece is approximately 2.54 cm×10.16 cm×0.10 mm and is substantially void-free.

EXAMPLE 2

A film consisting of a block/segmented copolymer of cisPBO and PEKBO at a weight ratio of 70 to 30 is prepared as in Example 1, Part A, and washed with running water for 48 hours. Without allowing the film to dry, the surface water is removed with paper towels. The film is folded back and forth upon itself to form a stack 12 layers thick. A piece of Teflon tape is placed between layers 6 and 7 near one end to prepare a T-peel type sample. A 2.54 cm×10.16 cm (×12 layer) sample is cut and placed into a vacuum bag assembly. Vacuum is applied and the assembly is placed in a hydraulic press. The sample is then consolidated/molded according to the following schedule:
1. Ramp room temperature to 100° C. at contact pressure. Hold for 10 minutes.
2. Ramp contact pressure to 34.5 MPa at 100° C.
3. Ramp 100° C. to 400° C. at 34.5 MPa. Hold for 10 minutes.
4. Cool under vacuum and pressure to <100° C.

The piece is removed from the vacuum bag assembly. The piece produced appears to be fully consolidated (i.e., individual film layers could not be seen or separated) except for the separation of approximately 1 cm at one end due to the Teflon tape. The sample is deep purple and glossy and is substantially void-free. The piece is approximately 2.54 cm×10.16 cm×0.20 mm. An approximately 6 mm wide lengthwise strip is cut from the sample and pulled by hand as a T-peel. The sample does not fail between
layers but tears across layers. Another sample, approximately 2.54 cm×1.9 cm is cut from the end of the sample opposite to the separated end. This sample is then cut in half, lengthwise and the cut edges marked. One of the two halves is placed in boiling water for 24 hours. After 24 hours, no apparent delamination of the boiled sample is observed. Both the 24 hour water-boiled sample and the control sample are submitted for microscopic examination. No delamination in the boiled sample could be seen, even at 100×. The boiled sample is also substantially void-free. The boiled sample and the control look virtually identical.

EXAMPLE 3

A. Preparation of a Film of a Controlled Molecular Weight Block/segmented Copolymer of CisPBO and PEEK at a Weight Ratio of 70 to 30

A dope is formed containing 70 weight percent cis-polybenzoxazole and 30 weight percent poly(aromatic ether ether ketone) (PEEK). The solvent acid of the dope is a mixture of methanesulfonic acid, polyphosphoric acid and phosphorus pentoxide.

The cis-polybenzoxazole blocks in the block copolymer have the calculated average number of mer units of 19. The poly(aromatic ether ether ketone) blocks in the block copolymer are the product of reacting oxy-bis-(4-benzoyl chloride) with 1,4-diphenoxybenzene.

The block copolymer is synthesized by (1) end-capping the polybenzoxazole block with decoupled carboxylic acid halide: (2) reacting the polybenzoxazole block terminated by a decoupled acid group with oxy-bis-(4-benzoyl chloride) and 1,4-diphenoxybenzene and benzoic acid (a terminator) under conditions such that aromatic electrophilic substitution occurs. The process is described in detail in Harris et al., Copolymers Containing Polybenzoxazole, Polybenzothiazole and Polybenzimidazole Moieties, International Application No. PCT/US 89/04464 (filed Oct. 6, 1989), International Publication No. WO 90/03995 (published Apr. 19, 1990) and in U.S. patent application Ser. No 407,973 (filed Sep. 15, 1989). The resulting block copolymer composition contains about 70 percent by weight cis-polybenzoxazole and about 30 percent by weight poly(aromatic ketone), and has an inherent viscosity of 6.6 dL/g, as measured in methanesulfonic acid at 25° C. and 0.05 g/dL concentration. Its concentration in the dope is about 3 weight percent. The resulting dopes are optically isotropic (not liquid crystalline). Film is prepared by casting the dope onto a polished stainless steel roll.

B. Consolidation of the Film

The film prepared in Part A is washed with water for 48 hours to remove the solvent acid. Without allowing the film to dry, the surface water is removed with paper towels. The film is folded back and forth upon itself to form a stack 12 layers thick. A 2.54 cm ×10.16 cm (×12 layer) sample is cut and placed in a vacuum bag assembly. Vacuum is applied and the assembly is placed in a hydraulic press. The sample is then consolidated/molded according to the following schedule:

1. Ramp room temperature to 100° C. at contact pressure. Hold for 10 minutes.
2. Ramp contact pressure to 34.5 MPa at 100° C.
3. Ramp 100° C. to 400° C. at 34.5 MPa. Hold for 10 minutes.
4. Cool under vacuum and pressure to <100° C.

The piece made is removed from the vacuum bag assembly. The piece produced appears to be fully consolidated (i.e., individual film layers could not be seen or separated). The sample is deep purple and glossy and is substantially void-free. The piece is approximately 2.54 cm×10.16 cm×0.20 mm. The density of the sample as determined by ASTM D 1505 is 1.49 g/cm$^3$. The modulus of the sample as determined by the determination of sonic velocity as in ASTM C 769 is 13.6 GPa.

EXAMPLE 4

A. Preparation of a Film of a Controlled Molecular Weight Block/Segmented Copolymer of CisPBO/APBO at a Weight Ratio of 70 to 30

A dope is formed containing 70 weight percent cis-polybenzoxazole and 30 weight percent ABPBO. The solvent acid of the dope is a mixture of methanesulfonic acid, polyphosphoric acid and phosphorus pentoxide.

The cis-polybenzoxazole blocks in the block copolymer have the calculated average number of mer units of 8.

The block copolymer is synthesized by the following steps:

1) Preparation of Functionally-Terminated cis PBO

In a nitrogen atmosphere, 4,6-diaminoresorcinol dihydrochloride (100.00 g, 0.4693 mo), terephthaloyl chloride (84.80 g, 0.4177 mol), and polyphosphoric acid of 76.7 st. percent P$_2$O$_5$ (406.3 g) are loaded into a 1 L resin kettle. The reaction mixture is mechanically stirred, blanketed with nitrogen, and warmed by a temperature-controlled bath. The reaction profile is as follows: 45° C., 16 hr: 95° C., +P$_2$O$_5$ (11×20.4 g), about 8 hr: 150° C.: 16 hr: 190° C. 24 hr. This dope is cooled and cut up under nitrogen and stored in a refrigerator.

2) Preparation of CisPBO/ABPBO (70/30) (W/W) Copolymer

In a nitrogen atmosphere, terephthaloyl chloride (1.05 g, 5.16 mmol), 3-amino-4-hydroxybenzoic acid hydrochloride monohydrate (7.97 g, 38.4 mmol), and polyphosphoric acid of 76.8 weight percent P205 (10.5 g) are loaded into a 100 mL resin kettle. Reaction mixture is mechanically stirred under nitrogen and warmed by a temperature-regulated bath. The reaction profile is as follows: 45° C., 1 hr; 95° C., +P205 (14.9 g), 4 hr; 95° C., +functional PBO dope from Step A (75.0 g), 16 hr: 150° C., 7 hr: 190° C. 24 hr. Polymer solution is cut and coagulated in water, extracted overnight in the Soxhlet extractor, and dried to constant weight at about 90° C. under vacuum. Yield=15.7 g. Inherent viscosity=17.0 dL/g (methanesulfonic acid, 0.047 g/dL, 25° C.).

B. Consolidation of the Films

The film prepared in Part A is coagulated in water and washed with running water for 48 hours. Without allowing the film to dry, the surface water is removed with paper towels. The film is folded back and forth upon itself to form a stack 12 layers thick. A 2.54 cm×10.16 cm (×12 layer) sample is cut and placed in a vacuum bag assembly. Vacuum is applied and the assembly is placed in a hydraulic press. The sample is then consolidated/molded according to the following schedule:

1. Ramp room temperature to 100° C. at contact pressure. Hold for 10 minutes.
2. Ramp contact pressure to 34.5 MPa at 100° C.
3. Ramp 100° C. to 400° C. at 34.5 MPa. Hold for 10 minutes
4. Cool under vacuum and pressure to <100° C.

The piece made is removed from the vacuum bag assembly. The piece produced appears to be fully consolidated (i.e., individual film layers could not be seen or separated). The sample is deep purple and glossy and is substantially void-free. The piece is approximately 2.54 cm×10.16 cm×0.20 mm. The density of the sample as determined by ASTM 150 is 1.47 g/cm$^3$. The modulus of the sample as determined by the determination of sonic velocity in ASTM C 769 is 9.11 GPa.

What is claimed is:

1. A process for consolidating/molding a material made of (a) block copolymers of rigid or semi-rigid PBZ with thermoplastic polymers, (b) block copolymers of rigid PBZ with semi-rigid PBZ, (c) molecular composites of rigid or semi-rigid PBZ with thermoplastic polymers, (d) molecular composites of rigid or semi-rigid PBZ with non-rigid PBZ polymers or (d) semi-rigid PBZ polymers, which process comprises:

(1) providing the material in its substantially acid-free, wet coagulated state, and in the form of a plurality of films or film layers, filaments or fibers, powders, or granules, (2) removing substantially all surface water remaining on the material, leaving the material with sufficient water to plasticize the material, (3) subjecting the material to a first pressure $P_1$ which is sufficient to provide a substantially void-free consolidated material upon molding, and (4) applying heat and a second pressure $P_2$ to the wet coagulated material in amounts sufficient to fuse the films or film layers, filaments or fibers, powders or granules into a single entity.

2. The process of claim 1 wherein the rigid or semi-rigid polybenzazole block consists of mer units that are represented by any one of the Formulae:

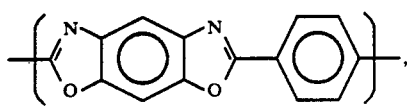
(a)

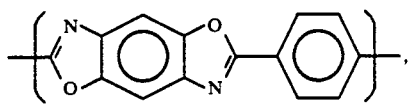
(b)

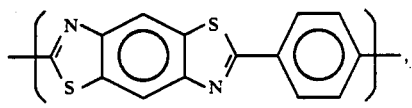
(c)

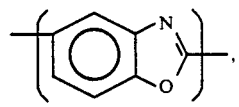
(d)

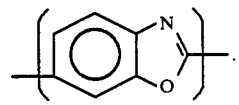
(e)

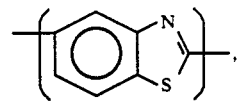
(f)

or

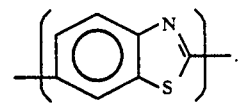
(g)

3. The process of claim 1 wherein the thermoplastic polymer is a thermoplastic polybenzazole polymer that contains mer units represented by any one of the Formulae:

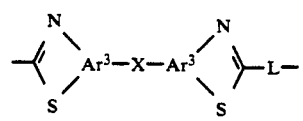
(a)

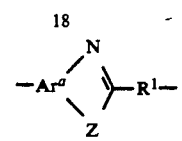
(b)

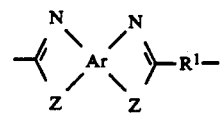
(c)

wherein
X is a bond or a first divalent linking moiety:
each Ar, $Ar^1$ and $Ar^3$ is an aromatic group:
L is a non-linear group that is stable under conditions at which the polymer is synthesized, fabricated and used;
$R^1$ is an aliphatic group that contains at least about 3 carbon atoms: and
each Z is an oxygen atom or a sulfur atom.

4. The process of claim 1 wherein the thermoplastic polymer is a polyamide, a polyimide, a polyquinoxaline, a polyquinoline, a poly(aromatic ether ketone) or a poly(aromatic ether sulfone), or a copolymer of those polymers with each other or polybenzazole.

5. A process for consolidating/molding a material made of (a) block copolymers of PBZ with thermoplastic polymers, (b) block copolymers of rigid PBZ with semi-rigid PBZ, (c) molecular composites of PBZ with thermoplastic copolymers, (d) molecular composites of PBZ with non-rigid PBZ polymers or (d) semi-rigid PBZ polymers, which process comprises:

(1) providing the material in its substantially acid-free, wet coagulated state, and in the form of a plurality of films or film layers, filaments or fibers, powders, or granules, (2) removing substantially all surface water remaining on the material, leaving the material with sufficient water to plasticize the material, (3) placing the material in a bag assembly and applying a fluid pressure of about 1 atmosphere to the material, (4) placing the bag assembly containing the material in a hydraulic press and applying temperature and pressure thereto under the following schedule:

(a) apply an increasing temperature from ambient to about 100° C. at a pressure of about 1 atmosphere (0.1 MPa or 14.7 psi) over a period of about 10 minutes, (b) apply an increasing pressure from about 0.1 MPa to about 35 MPa at 100° C.

(c) apply an increasing temperature from about 100° C. to about 400° C. at about 35 MPa over a period of about 10 minutes, and (d) cool to less than about 100° C.

* * * * *

UNITED STATES PATENT AND TRADEMARK OFFICE
CERTIFICATE OF CORRECTION

PATENT NO. : 5,244,617
DATED : September 14,1993
INVENTOR(S) : Connie J. Murphy and Wen-Fang Hwang It is certified that error appears in the above-identified patent and that said Letters Patent is hereby corrected as shown below:

Cover page, right hand col. the 17th line under the heading ABSTRACT, "tot he" should read -- "to the" --.

Col. 16, line 20, ":" should read -- ";" --.

Col. 16, line 21, ":" should read -- ";" --.

Col. 16, line 26, ":" should read -- ";" --.

Signed and Sealed this

Eleventh Day of October, 1994

BRUCE LEHMAN

Attest:

Attesting Officer

Commissioner of Patents and Trademarks